United States Patent [19]

Lopicolo et al.

[11] Patent Number: 4,856,332

[45] Date of Patent: Aug. 15, 1989

[54] ANGULAR RATE SENSOR NOZZLE

[75] Inventors: Mario T. Lopicolo, Southington; Richard E. Swarts, Simbsury, both of Conn.

[73] Assignee: United Technologies Corporation, Hartford, Conn.

[21] Appl. No.: 151,762

[22] Filed: Feb. 3, 1988

[51] Int. Cl.⁴ .............................................. G01P 3/28
[52] U.S. Cl. ................................. 73/505; 73/516 LM
[58] Field of Search ................... 73/505, 515, 516 LM

[56] References Cited

U.S. PATENT DOCUMENTS 3,205,715 9/1965 Meek ...................................... 73/505
3,403,563 10/1968 Bowles ................................... 73/505

Primary Examiner—John Chapman
Attorney, Agent, or Firm—Lloyd D. Doigan

[57] ABSTRACT

An angular rate sensor is provided having a specially shaped nozzle which shapes the velocity profile of a gas stream passing through a nozzle so that a linear portion of the profile impinges upon the resistive elements of the sensor even when large angular rates of turn in a plane of sensitivity are encountered. The nozzle is generally rectangularly shaped having a pair of parallel sides arranged perpendicularly to the resistive elements of the sensor and a pair of connecting sides.

1 Claim, 4 Drawing Sheets

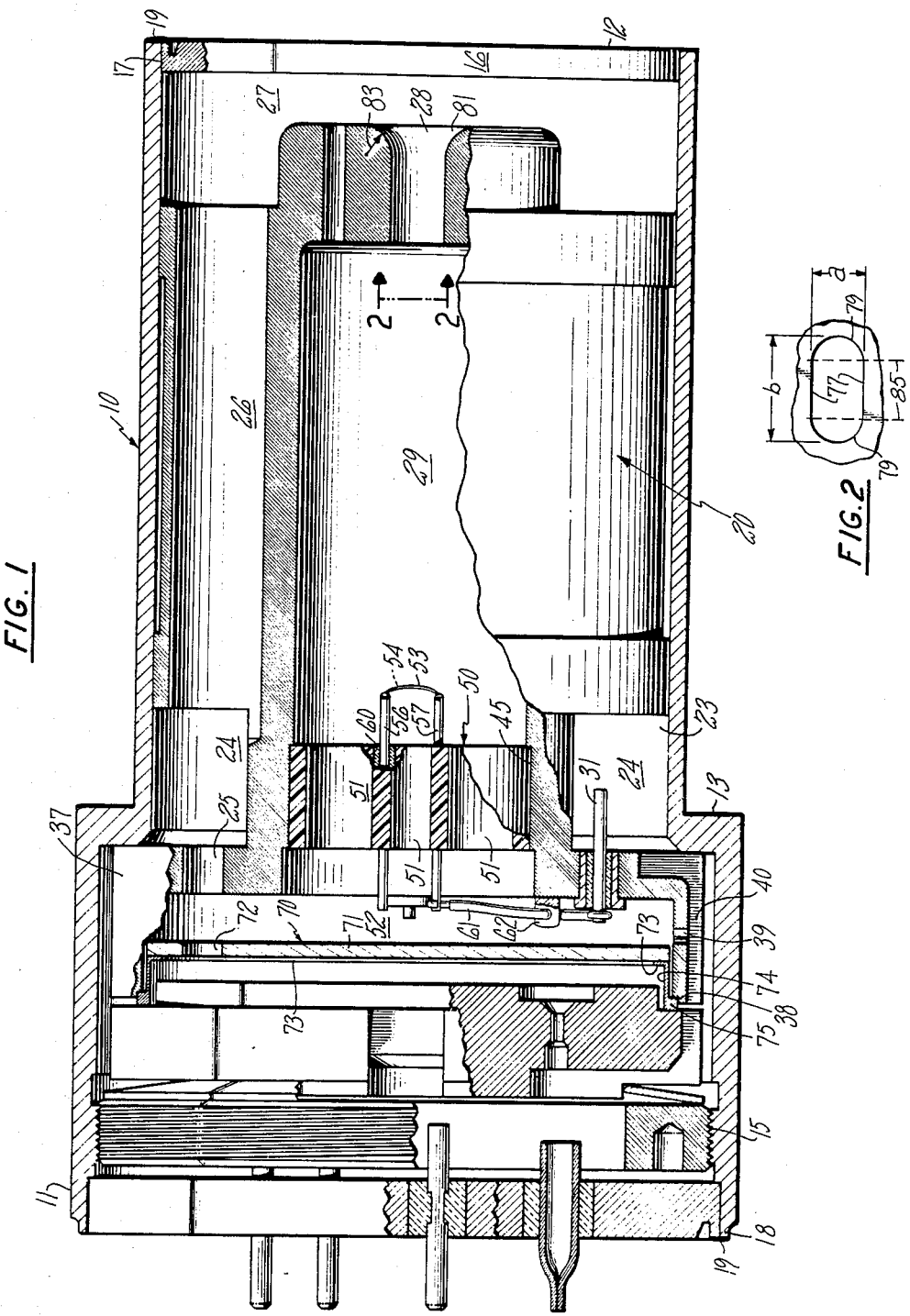

ANGULAR RATE SENSOR NOZZLE

TECHNICAL FIELD

This invention relates to an angular rate sensor and more particularly to an angular rate sensor that incorporates a particularly shaped nozzle.

BACKGROUND ART

In fluidic angular rate sensors, a stream of a suitable fluid, such as an inert gas, is pressurized and passed through a nozzle. The stream of fluid is directed by the nozzle toward a pair of temperature sensitive resistive elements which are differentially cooled by the stream whenever the stream is diverted (such as by Coriolis forces that are encountered during angular rotation of the sensor). The differential cooling provides a measurable differential signal across the resistive elements which is proportional to the angular rate of turn of the sensor. Such fluidic rate sensors are generally accurate in a plane of sensitivity which is generally defined as being perpendicular to the plane in which the resistive elements lie. Fluidic angular rate sensors are typified by those disclosed in U.S. Pat. Nos. 3,587,328, to Schuemann, 3,626,765 to Moore, and 4,020,700 to Lopiccolo et al.

Such prior art angular rate sensors utilize a nozzle having a circular opening The circular opening provides a laminar gas stream having a parabolic velocity profile As is well known, the shape of the velocity profile of the gas stream is defined as a function of the distance from the center of the opening. The gas stream moves more quickly at its center and moves more slowly near its sides thereby defining the parabolic shape of the profile. A portion of each leg of the profile is roughly linear. Each linear portion impinges upon one of the resistive elements throughout the normal operating range of the rate sensor. If the portions of the profile that impinge upon the resistive elements are nonlinear, measurement of the differential cooling of the elements may not provide an accurate measurement of the angular rate of turn of the sensor. If the angular rate sensor of the above described prior art are rotated at greater than about 500°-600° per second, the Coriolis forces tends to bend the profile such that a nonlinear portion of the profile impinges on one or both of the resistive elements. An inaccurate measurement of the angular rate of turn of the sensor may then result.

DISCLOSURE OF INVENTION

It is an object of the invention to provide a fluidic rate sensor which accurately measures angular rates of turn of up to about 10,000° per second.

It is a further object of the invention to provide an angular rate sensor which provides a gas stream which has a velocity profile that has a relatively large linear portion which impinges upon the resistive elements of the sensor during high angular rates of turn.

According to the invention, an angular rate sensor is provided having a nozzle which shapes the velocity profile of a gas stream passing therethrough so that a linear portion of the profile impinges upon the resistive elements of the sensor even when high angular rates of turn are encountered. The nozzle is generally rectangularly shaped having a pair of parallel sides arranged perpendicularly to the resistive elements of the sensor and a pair of connecting sides. In a referred embodiment the connecting sides are semi-circularly shaped.

These and other objects, features and advantages of the present invention will become more apparent in light of the detailed description of a best mode embodiment thereof, as illustrated in the accompanying drawing.

BRIEF DESCRIPTION OF DRAWING

FIG. 1 is partially sectioned, partially broken away side elevation of the fluidic rate sensor of the invention.

FIG. 2 is a view of the rate sensor nozzle of FIG. 1 taken along the line 2—2.

BEST MODE FOR CARRYING OUT THE INVENTION

Figure 3:
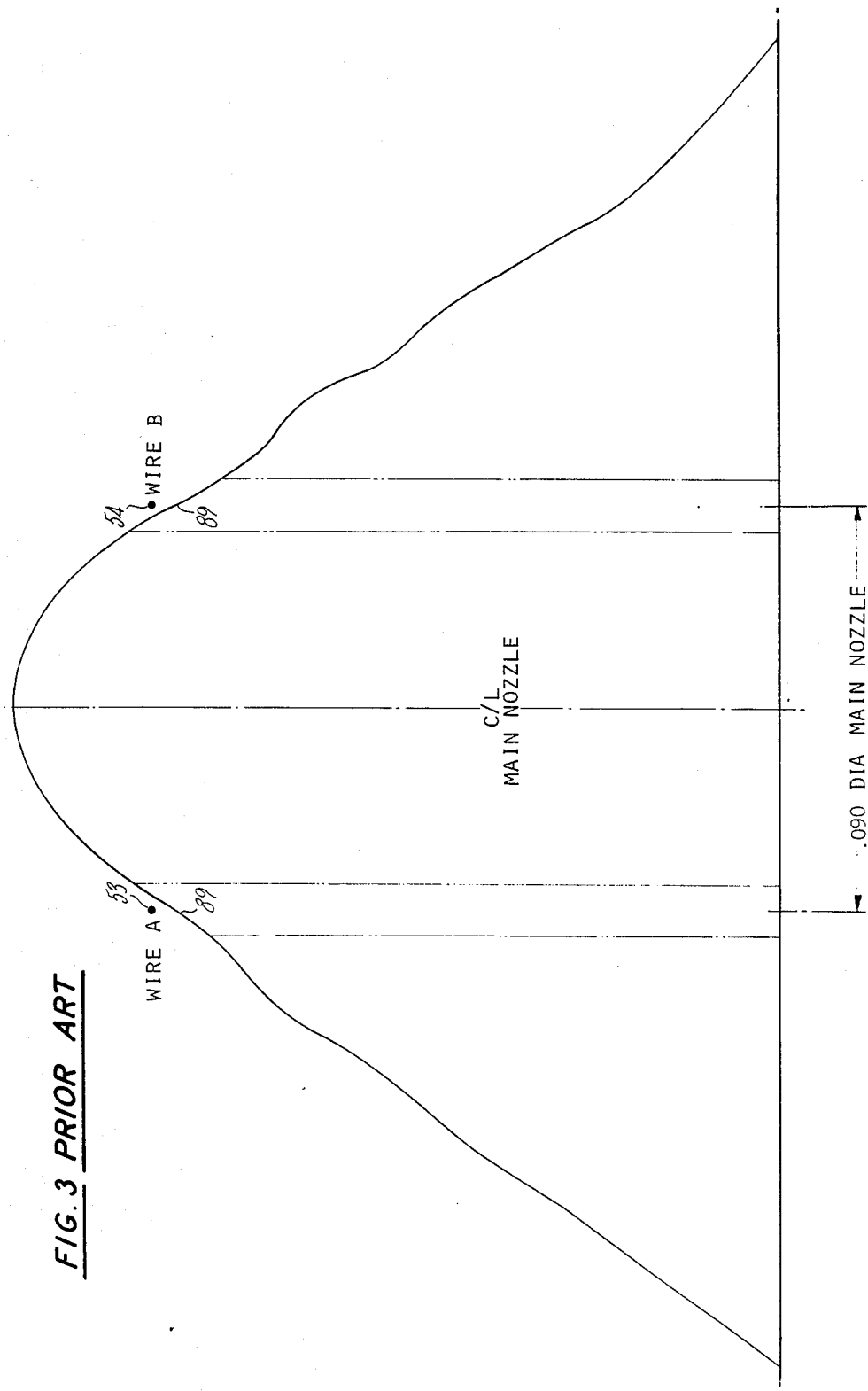
FIG. 3 is a graphical depiction of the roughly parabolic flow profile of a prior art nozzle.

Referring to FIG. 1, the sensor (not illustrated in scale) includes a thin walled cylindrical casing 10 having an access end 11 and a closed end 12. The access end 11 includes internal threads 15 for receiving a lock nut that secures the sensor internal components within the casing. The casing includes weld lips 17,18 at each end. An end cover 16 is bead welded 19 to the lip 17 at the closed end to provide an hermetic seal with the casing and a similar bead weld 19 at the access end hermetically seals a header to the casing. The casing is constructed of a non-magnetic, anti-corrosive material, such as 300 Series stainless steel.

Internally, the sensor includes a cylindrically shaped nozzle block 20 having two overall diameters associated with two different internal diameters of the casing resulting from the shoulder 13. The nozzle block 20 has a major annular groove 23 which, with the case, forms a fluid manifold chamber 24 for receiving fluid under pressure from a feed port 25 formed in the wall of the groove 23. The nozzle block also includes; fluid feed tubes 26 which conduct the pressurized gas stream from the feed manifold chamber to an inlet manifold chamber 27 formed between the nozzle block and the end cover 16, and a nozzle 28 (as will be discussed infra) disposed in the end wall of the nozzle block to provide a fluid conduit from the manifold chamber 27 into a jet chamber 29 formed as a major axial bore within the block. The nozzle block also has a pump mounting flange 37 including an internal counter bore 38, a wire feed through hole 39, and a plurality of mill slots (such as the slot 40) which may be used either for wire passageways or as a key for aligning the nozzle block within the casing. The nozzle block is constructed of a nonmagnetic, anti-corrosive material, such as 300 series stainless steel.

The nozzle block further includes a counter bore 45 for seating a sensor plug assembly 50 in alignment with the nozzle in the jet chamber 29. The plug assembly includes exhaust ports 51 to permit the fluid flow through the plug into an exhaust chamber 52 formed in the pump mounting flange 37. The sensing elements, which are preferably tungsten wires 53, 54, are mounted to associated pairs of Kovar ♦ metal alloy posts (56, 57 for the element 53). The posts are secured in the plug through glass insulators 60 and the sensor elements are connected through insulated wires 61 (and posts 62)

which may be routed through the milled slot 40 to the access end of the casing.

The impulse pump assembly 70, described hereinafter with respect to FIG. 1, includes a piezoelectric diaphragm 71 with a pump orifice 72. The diaphragm is metallurgically bonded to a mounting rim 73 of a flexible, cylindrical support flexure 74. The flexure has an oppositely directed support rim 75 at the other end which seats in the counter bore 38 of the nozzle block.

During operation, the application of AC voltage to the piezoelectric diaphragm causes the diaphragm to oscillate, producing fluid pressure pulsations in the pump chamber 76 formed internally of the flexure 74. These pulsations force fluid under pressure through the pump orifice 72, creating a fluid pressure concentration in the exhaust chamber 52. The exhaust chamber in turn forces the fluid through the feed port 25, the manifold 24, and the feed tubes 26 to the inlet manifold chamber 27 which supplies the nozzle 28. The flow rate of the fluid in cubic feet per minute (CFM) is dependent on the geometry of the pump chamber, the pump diaphragm, and the frequency of oscillation of the pump. The fluid velocity $V_p$ within the jet chamber is established by the cross sectional area (A) of the nozzle, or $V_p = CFM/A$. The fluid pressure at the plenum chamber is typically about 0.0005 p.s.i. which will maintain a gas stream velocity of about 100 inches per second and a flow rate of less than 2 cubic feet per hour. The Reynolds number of the gas stream at the nozzle is between 400 and 1,000 to provide a laminar flow from the nozzle.

Referring now to FIG. 2, the nozzle of the invention is shown. The nozzle opening has a pair of parallel sides 77 being spaced a distance a apart of about 0.060 to 0.064 inches and a pair of connecting portions 79 being spaced a distance b apart of about 0.122 to 0.126 inches. The connecting portions may be semicircularly shaped to reduce turbulence around the sides of the bore thereby stabilizing the velocity profile of the gas flow. The input end 81 (see FIG. 1) of the nozzle is faired along a radius 83 of about 0.065 to 0.075 inches to help achieve a laminar flow velocity profile of the gas stream exiting the nozzle. The output end of the nozzle is placed perpendicularly about 0.204 inches from the sensing elements. Each sensing element aligns with the end portions of the connecting portions (see phantom lines 85 which indicate the positions of the sensing elements 53,54).

Figure 4:
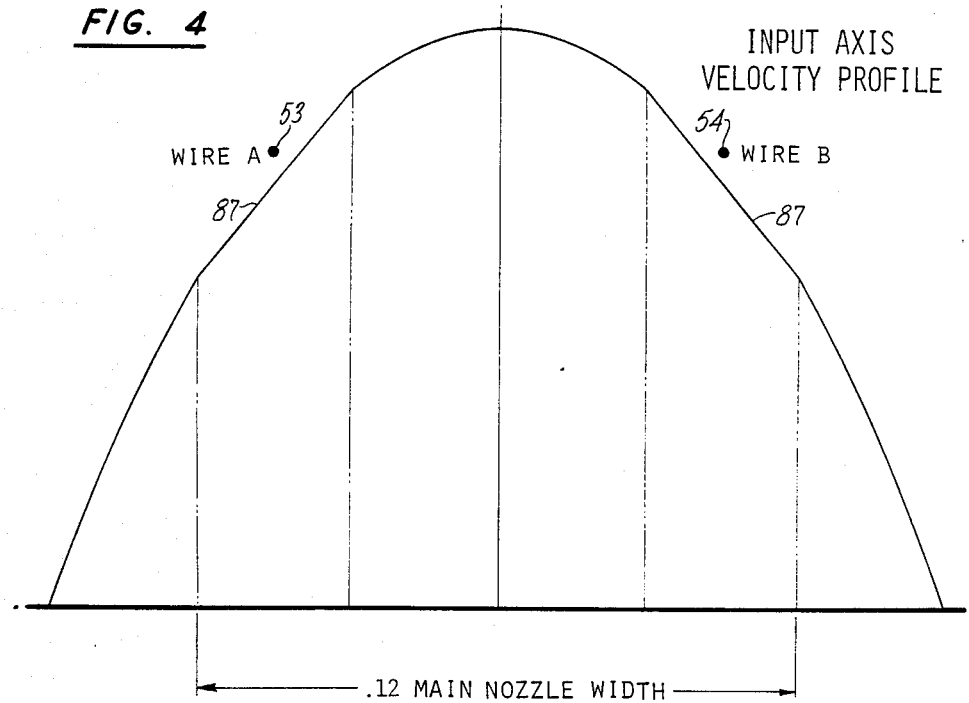
FIG. 4 is a graphical depiction of the roughly parabolic flow profile of the nozzle of FIG. 2.

In operation, the shape of the nozzle creates a velocity profile (see FIG. 4) within the gas stream impinging upon the sensing elements. The velocity profile has a pair of relatively large, substantially linear (i.e. below 1% deviation from linearity) portions 87 along the sides of the profile. Each portion 87 is centered about one of the sensing elements. FIG. 3 shows the velocity profile provided by a prior art circular nozzle. The prior art profile has a pair of substantially linear portions 89 that are much smaller than the portions 87. Because of the larger areas of linearity provided by the roughly rectangularly shaped nozzle of this invention, larger bending moments of the gas stream caused by rapid angular motion (i.e. up to 10,000 degrees per second) minimize the probability that a nonlinear area of the velocity profile impinges upon the sensing elements. By minimizing the probability that the non-linear portions of the velocity profile impinge upon the sensing elements, a more precise measurement of the angular rate of turn of the sensor in a plane of sensitivity is obtained.

Figure 5:
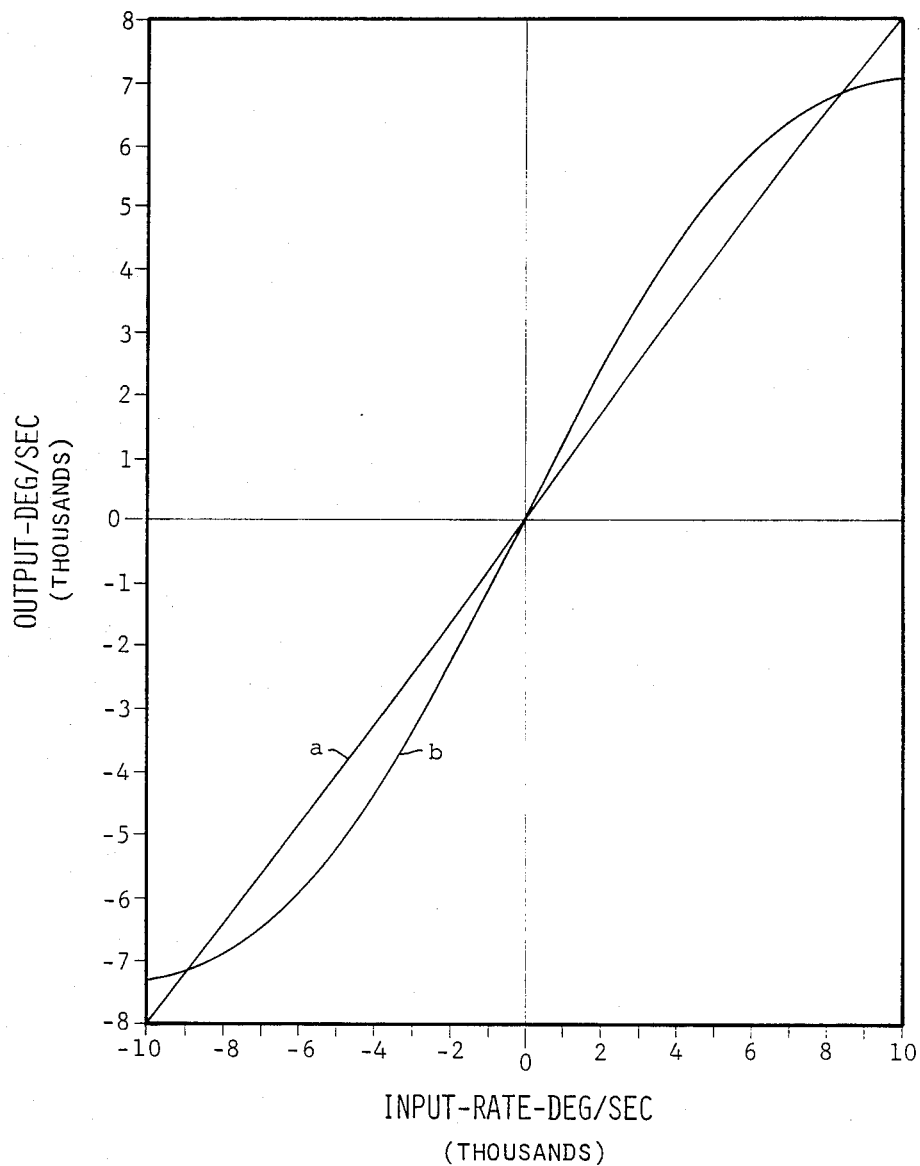
FIG. 5 is a graphical comparison of the linear response of the prior art nozzle and the nozzle of FIG. 2.

FIG. 5 demonstrates the linearity of response relating to the linearity of the output of the sensing elements. A change in the angular rate of turn gives a demonstrably linear response of the cooling of the sensing elements (see curve a). In contrast thereto, the response of the standard circular nozzle is decidedly nonlinear (see curve b) and therefore subject to inaccurate differential velocity across the sensing elements which lead to inaccurate measurements of angular rate of turn.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. In a fluidic rate sensor having a nozzle, a pumping means for pressurizing a stream of gas which passes through said nozzle, said gas stream forming a laminar velocity profile as it passes from said nozzle, and temperature sensitive elements disposed in the path of said gas stream, said elements being differentially cooled by said gas stream impinging upon said elements as a function of an angular rotation of said rate sensor in a plane of sensitivity, the improvement comprising:

said nozzle having an opening means for directing said stream of gas such that a portion of said velocity profile of said stream of gas impinging upon said temperature sensitive elements is substantially linear for angular rotation rates of up to 10,000 degrees per second in said plane of sensitivity, said opening means having a pair of parallel portions, and a pair of side portions connecting said parallel portions, each said side portions having a semi-circular shape, said parallel portions being arranged perpendicularly to said temperature sensitive elements.

* * * * *